Figure 1:
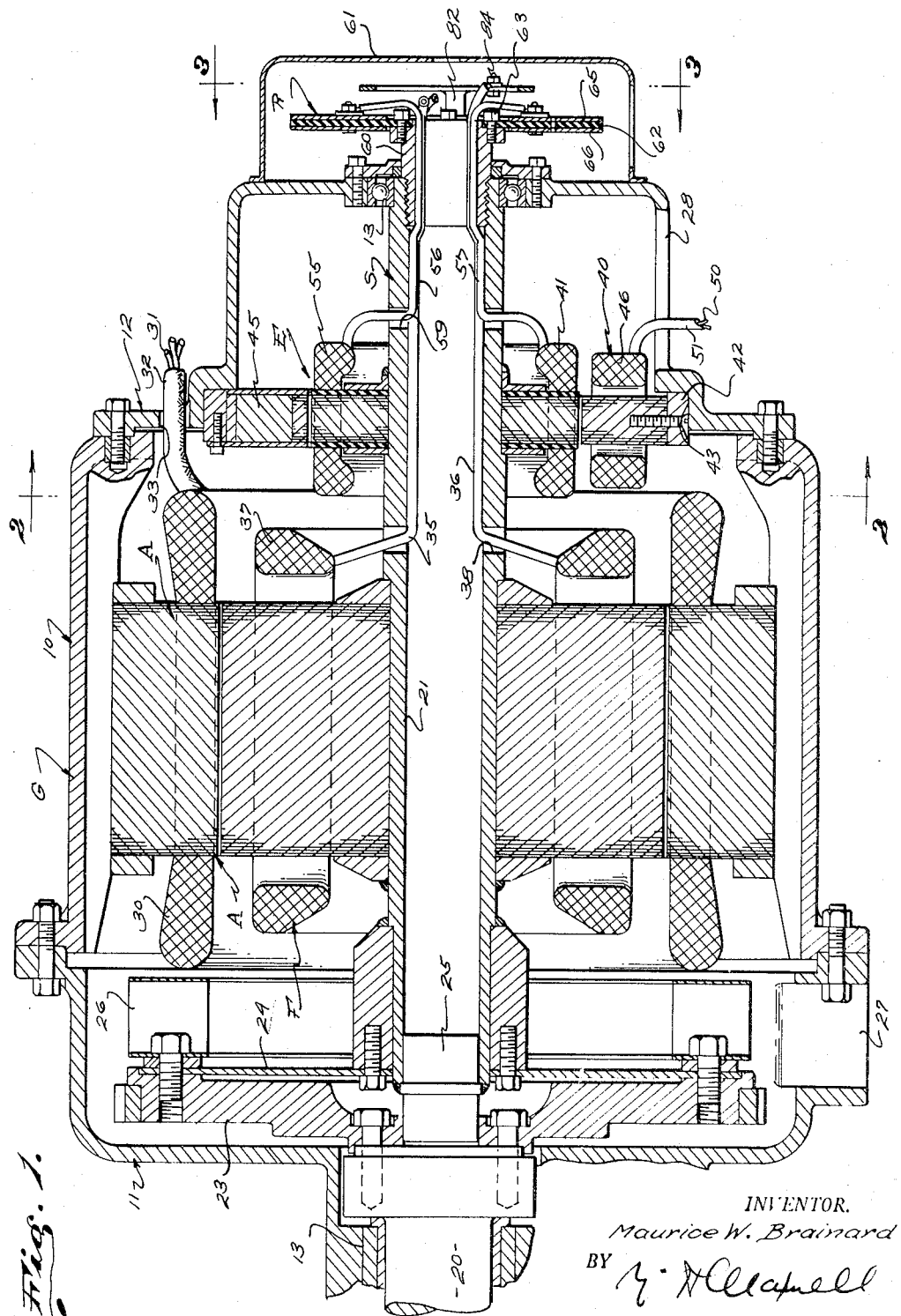

Nov. 1, 1955     M. W. BRAINARD     2,722,652
EXCITATION SYSTEM FOR ELECTRICAL MACHINES
Filed April 27, 1950     4 Sheets-Sheet 1

INVENTOR.
Maurice W. Brainard
BY
Attorney

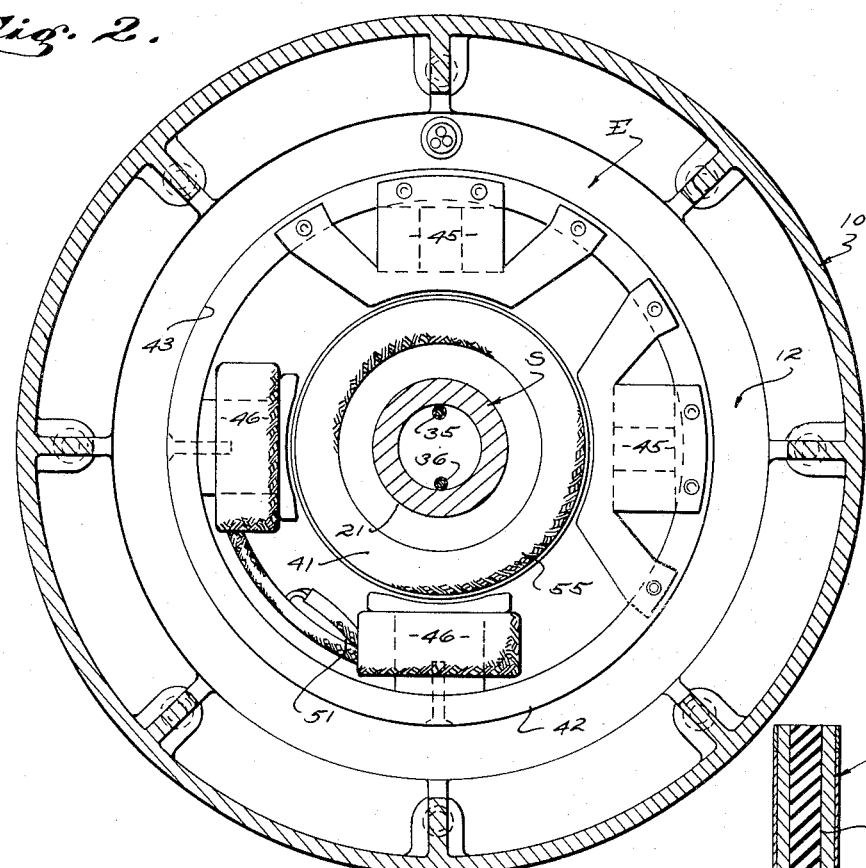
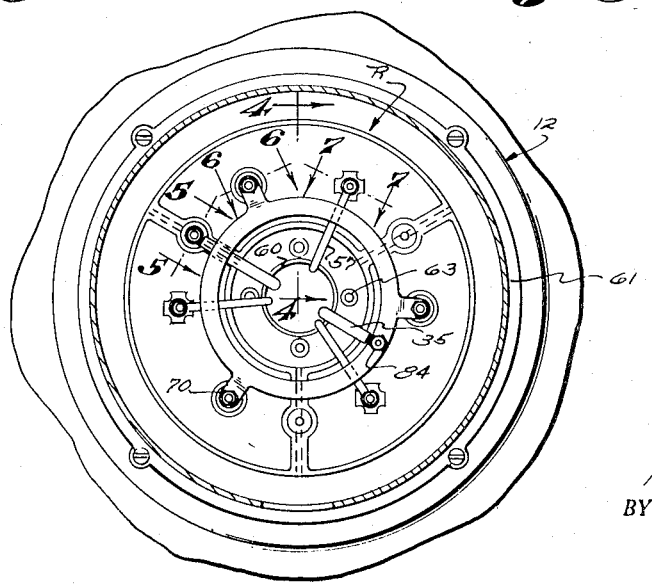
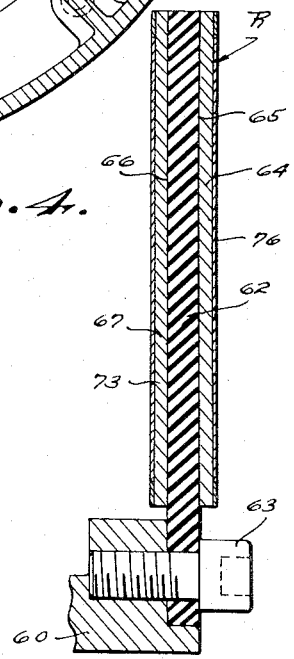

Nov. 1, 1955  M. W. BRAINARD  2,722,652
EXCITATION SYSTEM FOR ELECTRICAL MACHINES
Filed April 27, 1950  4 Sheets-Sheet 3
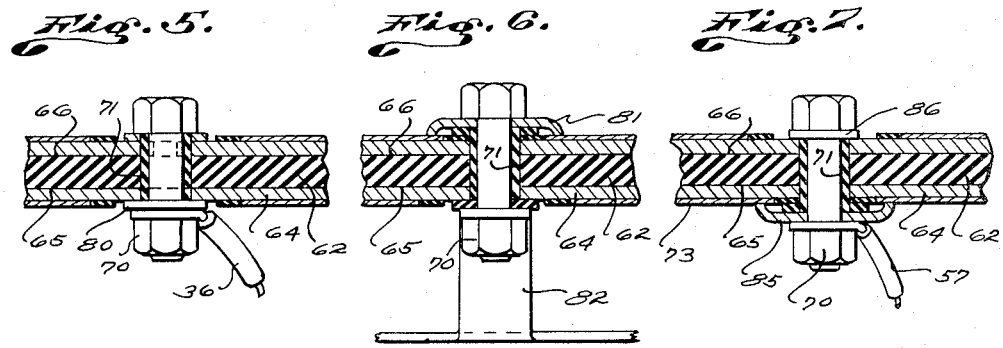
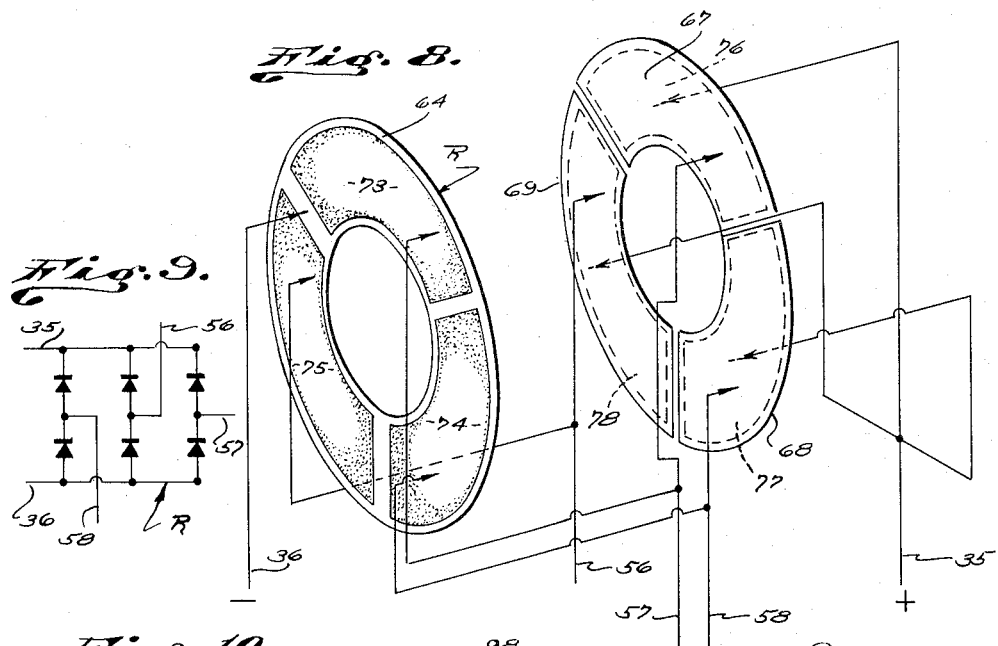
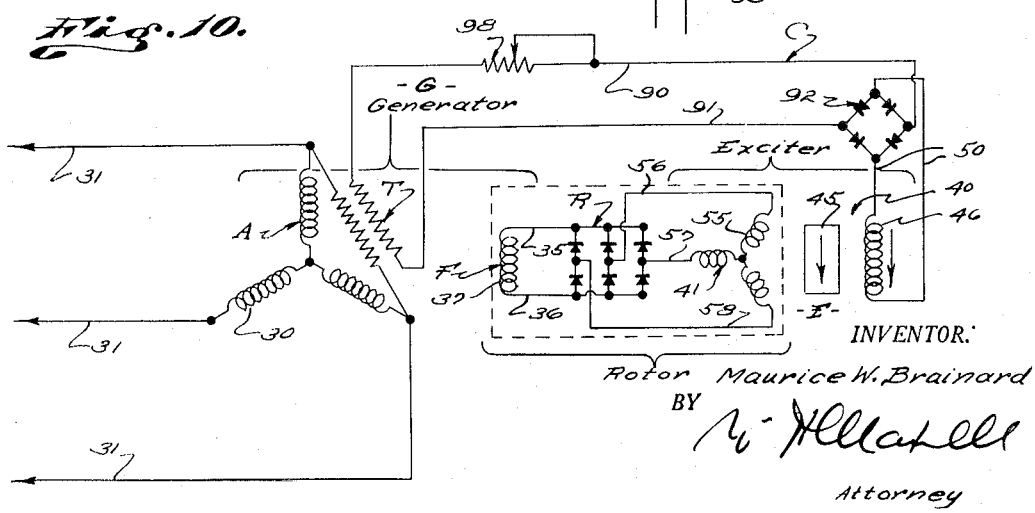
INVENTOR.
Maurice W. Brainard
BY
Attorney

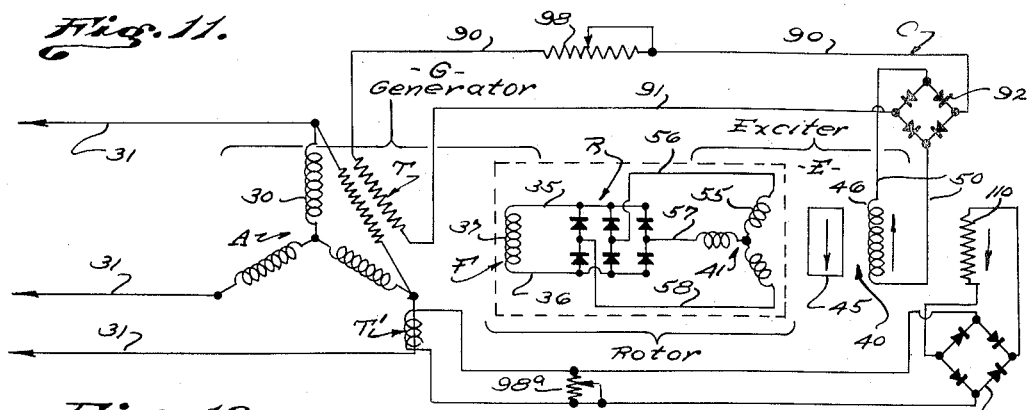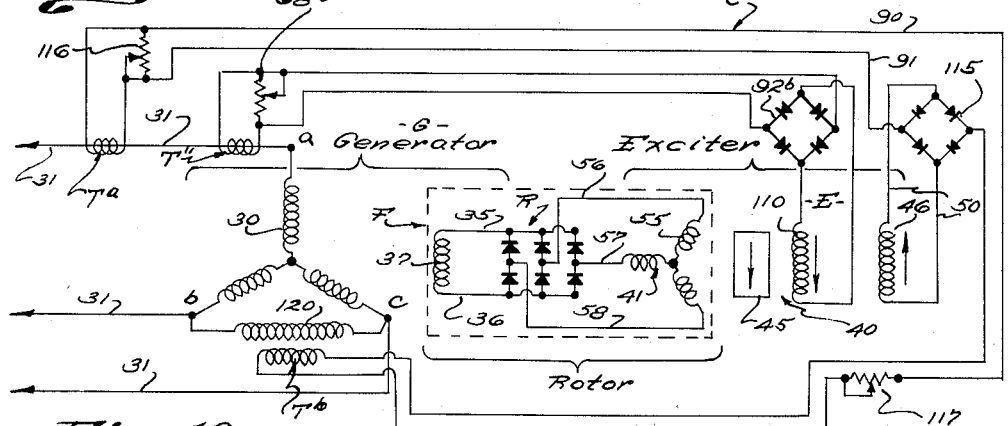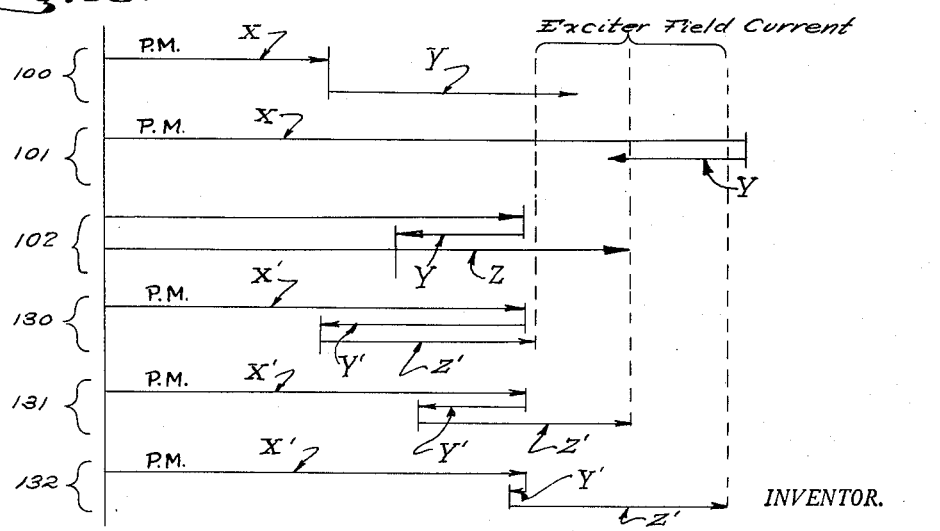

United States Patent Office 2,722,652
Patented Nov. 1, 1955

2,722,652

EXCITATION SYSTEM FOR ELECTRICAL MACHINES

Maurice W. Brainard, Los Angeles, Calif., assignor of one-half to O'Keefe & Merritt Company, Los Angeles, Calif., a corporation of California Application April 27, 1950, Serial No. 158,495

21 Claims. (Cl. 322—25)

This invention has to do with electrical machines and it is a general object of the invention to provide a simple, practical, effective electrical mechanism free of various mechanical complications or characteristics common to most such machines.

Common or usual electric machines such, for example, as generators involve devices in the nature of mechanical rectifiers. These mechanical devices usually are in the form of commutators, slip rings and the like, and involve brushes, brush rigging and other such mechanical features. In practice most failures and necessary repairs incidental to electric machines result from or are necessitated by the commutators, slip rings and like devices just referred to.

It is a general object of this invention to provide an electric machine in which the usual mechanical means in the form of a commutator or slip rings is eliminated and in place thereof a rectifier is provided which is free of relatively working parts or brushes, etc. and which is such that it can be advantageously incorporated in or as a part of the rotor of the machine.

It is a further object of this invention to provide an electric machine of the general character referred to in which a dry or plate type rectifier is employed and is so related to the other parts of the machine that it can be easily and quickly replaced or repaired as circumstances may require. In accordance with the present invention the rectifier employed can be located so that it is immediately accessible at one end of the machine and is not incorporated within the machine as is usually the case with a commutator, or the like.

It is a further object of this invention to provide a machine of the character referred to involving a dry or plate type rectifier which is of compact form, occupying but little space axially of the machine, thus making it possible to provide a machine which is of minimum overall length.

It is another object of this invention to provide a rectifier of improved form and construction and which is such that it can be used to advantage in electrical generators, or the like.

Another object of the invention is to provide a rotor for an electric machine and which includes in one single unit the main field of the machine, the armature of an exciter or A. C. generator and a rectifier converting the output of the exciter to supply the main field with direct current, all without resort to brushes, slip rings or other like mechanical features.

A further object of the invention is to provide an electric generating machine, or the like, of the general character referred to, including a control system by which the field exciter varies in action with the electric load on the generator.

A further object of the invention is to provide an electric generator, or the like, of the general character referred to involving an exciter with a compound field including a permanent magnet and electromagnetic units and in which a control system is provided by which one or more of the electromagnetic units are varied in action in response to variation of the power factor of the generator load.

The present invention can be employed in various electric machines and it can be incorporated to advantage in a machine such as an electric generating machine involving, generally, a main generator, the field of which has one or more electromagnetic units or elements energized by an exciter, which exciter develops or generates alternating current that is handled by a rectifier so that direct current is supplied to the field of the generator. In a preferred embodiment the generator involves a case with inner and outer ends and a shaft which extends through the case and carries a field which operates within an armature mounted in the case. The field carrying shaft has a longitudinal opening therein and serves to carry the rotating part of the exciter and also the rectifier so that these elements combined form a single rotor. The exciter involves a field carried in the case, for instance, by one end thereof, and an armature on the shaft and within the field. The field of the exciter is made up of one or more permanent magnets and one or more electromagnetic units. In the preferred arrangement the rectifier is carried by the shaft to operate therewith and it may be located on the end of the shaft or at the exterior of the casing of the generator so that it is readily accessible.

The rectifier is of the dry plate type or of the type commonly referred to as a selenium type rectifier, although any suitable material or combination of materials may in practice be used in its construction or formation. In accordance with the invention the rectifier is characterised by a plurality of plate-like elements, one of which may be employed as a support for the others. In a typical case a flat carrier of insulating material supports plates of base metal on which bodies of selenium, or the like, occur. Suitable electric connections or lines extend through the shaft connecting the field of the machine, the armature of the exciter and the rectifier.

A control provided by the present invention provides for energization of one or more of the electromagnetic units of the exciter from the output of the main generator. In a typical and simple arrangement a transformer is energized by the voltage of the generator. The output from the secondary of the transformer is rectified by a suitable rectifier, and is delivered to one or more of the electromagnetic units of the exciter. In accordance with the invention where the field of the exciter is a compound field embodying both permanent magnet and electromagnetic units, the control may be such that the action of the electromagnetic unit is added to that of the permanent magnet or residual magnetism or it may be related thereto so as to buck the permanent magnet. In another form of the invention the exciter has a compound field with an electromagnet field element and a plurality of electromagnetic coils, one of such coils being energized by the generator through a current transformer to act with and to supplement the action of the permanent magnet while another of these coils is operated or energized by a potential transformer energized from the generator and serves to buck the action of the first mentioned coil and the permanent magnet. In an improved form of the invention a second current transformer may be connected into the bucking circuit in such phase relation that the resulting excitation of the exciter field will vary as a function of the power factor of the load on the generator, the excitation increasing in strength as the power factor becomes more lagging.

The various objects and features of my invention will be fully understood from the following detailed description of typical preferred forms and applications of the invention, throughout which description reference is made to the accompanying drawings, in which:

Fig. 1 is a longitudinal detailed sectional view of a unit involving a generator, exciter and rectifier. Fig. 2 is a detailed transverse sectional view of the structure shown in Fig. 1, being a view taken as indicated by line 2—2 on Fig. 1. Fig. 3 is a detailed transverse sectional view taken as indicated by line 3—3 on Fig. 1. Fig. 4 is an enlarged detailed sectional view taken as indicated by line 4—4 on Fig. 3. Figs. 5, 6 and 7 are enlarged detailed sectional views taken on lines 5—5, 6—6 and 7—7, respectively, on Fig. 3. Fig. 8 is a diagrammatic view illustrating the electrical elements and connections involved in the rectifier. Fig. 9 is an electrical diagram of the rectifier. Fig. 10 is an electrical diagram illustrating a typical form of the present invention. Fig. 11 is a diagram similar to Fig. 10 showing another form of the invention. Fig. 12 is a diagram similar to Figs. 10 and 11, illustrating further form of the invention, and Fig. 13 is a diagrammatic view illustrating comparative action or performance of the forms of the invention shown in Figs. 10, 11 and 12.

The present invention provides various features applicable generally to electric machines. To facilitate an understanding of these features I will proceed to describe my invention as applied to an alternating current generator, however, it is to be understood that this type of machine is designated merely for purpose of example and that the invention is equally applicable to machines designed or designated for other specific purposes.

A typical embodiment of the present invention involves, generally, a main generator G, an exciter E supplying field current to the main generator G, and a rectifier R rectifying the current from the exciter E, and delivered from the exciter as alternating current, so that it is supplied to the generator G as the direct current. In the particular form of the invention illustrated in the diagram Fig. 10, the field of the exciter is a compound field involving one or more permanent magnets and one or more electromagnetic elements, and a control system C is illustrated receiving power from the main generator and supplying such power to one or more of the electromagnetic elements of the exciter field to vary the output of the exciter.

The main generator G employed in carrying out the invention may vary widely in form and construction. In the example of the invention illustrated in the drawings, the generator G is an alternating current generator having an electrically excited field, and for the purpose of the invention the exciter E will be referred to as an element separate from the generator, although it may if desired be treated or considered as a part of the generator.

In construction the generator G is shown as involving a case having a cylindrical body 10 and an end 11 closing the inner end of the body and an end 12 closing the outer end of the body. A shaft S is rotatably supported in bearings 13 at the ends of the generator and extends centrally through the body 10. An armature assembly A is fixed in the body 10 of the case and a field assembly F is fixed on the shaft S to operate within the armature.

In the particular case shown in Fig. 1 of the drawings, the shaft S has a drive section 20 entering the case through the inner end 11 and has a tubular section 21 joined or coupled to the drive section and extending through the case to carry the field F and to be supported in the bearing at the outer end of the case. In the particular case illustrated the drive section 20 may be a part or continuation of a shaft provided on a prime mover such as an engine and in such case the coupling between the shaft sections 20 and 21 may involve a fly wheel 23 fixed on shaft section 20 within the case and flexible coupling elements 24 joining the flywheel 23 and the tubular shaft section 21. When such a structure is employed, it may be desirable that an extension or pilot 25 of shaft section 20 be provided to enter the end portion of the tubular section 21 to hold the sections in alignment. In the particular case illustrated in the drawings, a fan or blower 26 is provided on the flywheel 23 and as the generator operates, the blower serves to circulate air through the structure, air openings 27 and 28 being provided in the ends 11 and 12 respectively.

The armature A of the main generator G is shown as an annular assembly fixed in the body 10 of the case and the windings 30 of the armature A have suitable lead lines 31 extending from the generator in a cable 32 passing from the case of the generator through a suitable opening 33.

The field F of the main generator is a suitable assembly fixed on the tubular section or portion 21 of the shaft S to occur within the armature A and lead lines 35 and 36 to the windings 37 of the field extend through the shaft section 21 outward through lateral openings 38 in shaft section 21.

The exciter E which is in effect a part or accessory of the main generator G is preferably located within the case of the main generator. In accordance with the present invention the exciter is a simple or conventional alternating current generator involving a fixed or stationary field 40 and a rotating armature 41. The exciter is shown as a three phase generator since that is a simple full winding machine, however, it could be made as a single phase, two phase, or six phase machine etc. as circumstances require. In the arrangement shown in the drawings, the exciter E is located or carried within the end 12 of the generator case and the field 40 is an annular assembly carried in a ring 42 mounted in a bore 43 provided in the end 12. In the particular form of the invention shown in the drawings and shown in the diagram Fig. 10, the field 40 of exciter E is a compound structure involving permanent magnets 45 and electromagnets involving windings 46. With the ring 42 provided as hereinabove described and as illustrated in Figs. 1 and 2 of the drawings, the end 12 of the case supporting the field 40 may be formed of non-magnetic material, in which case the ring 42 is formed of magnetic material such as iron to provide the necessary carrier for the desired magnetic flux for fields. Where the field 40 is a compound structure as illustrated in the drawings, the windings 46 of the electromagnets thereof may be energized from lead lines 50 carried in a cable 51 entering the case of the generator G through a suitable opening.

The armature of the exciter E is fixed on the shaft section 21 to occur within the field structure 40 and the windings 55 (shown as three phase) of the armature 41 have output leads 56, 57 and 58 that extend from the windings 55 into the shaft section 21 through lateral openings 59 to extend through the shaft to the rectifier R.

The rectifier R, as provided by the present invention, receives the alternating current output from the exciter E and rectifies it to supply direct current to the leads 35 and 36 that extend from the rectifier R to the windings 37 of the field F of generator G. In accordance with the present invention, the rectifier R is mounted on or carried by the shaft S so that it operates therewith or as a unit with the field F of the generator G and armature 41 of exciter E. The shaft S, field F, armature 41 and rectifier R form the rotor of the machine. In the preferred form of the invention the rectifier is a simple dry or plate type rectifier and may, for example, be of the type generally referred to as a selenium rectifier. I will for purpose of example refer to the rectifier as involving selenium elements or plates related to bodies or plates of base metal. It is to be understood that I may use copper oxide, magnesium-copper sulphide or any semi-conductive material having a suitable rectifying characteristic in place of selenium. When I use the term selenium, I mean to include all equivalents thereof.

The particular selenium rectifier illustrated in the drawings is such as to handle three phase alternating current as is delivered by the exciter E through the lines 56, 57 and 58 and it delivers direct current through the lines 35 and 36.

Although the rectifier R may in practice vary widely in form, construction and arrangement, it is preferred that it be mounted or carried at the outer end of shaft portion 21 or beyond the outer bearing 13 supporting shaft S, in which case it is in effect on the end of shaft S where it may be mounted by means of a shaft extension 60. In the particular case illustrated, it is beyond or outward of the end 12 of the generator case and is enclosed by a separate housing or extension 61 of end 12, see Fig. 1 of the drawings.

The rectifier construction involves a plurality of plates or plate like elements and one of these may be used as a mounting or carrier for the others. The particular case illustrated involves a carrier 62 of insulating material, plates of base metal on the carrier and bodies of selenium, or the like, on the plates.

The carrier is shown as a flat round disc of insulating material mounted on the extension 60 by suitable fasteners 63 so that it is concentric with the shaft and is in a plane normal to the axis of the shaft.

A plate 64 of suitable base metal, such as aluminum, is arranged at the outer side 65 of the carrier and may be an annular plate arranged concentric with and flat against the carrier. A plate of like base metal at the inner side 66 of the carrier 62 is segmental in form and involves three like base sections 67, 68 and 69 which are flat and arranged in an annular series and flat against the carrier.

So far as the present invention is concerned, the plates of base metal above referred to may be mounted on or secured to the carrier 62 in any suitable manner. In the drawings I have illustrated these parts joined or secured together by screw fasteners 70 which extend through openings in the plates or plate sections and through openings in the carrier. The fasteners 70 may be formed of metal or conducting material, in which case it is preferred that insulating bushings 71 be provided on the fasteners to insulate them from the other elements as shown in Figs. 5, 6 or 7 of the drawings.

The rectifier R includes in addition to the carrier 62 and the plates above-described, bodies 73, 74 and 75 of selenium, or the like, on the outer or exposed side of plate 64 and bodies 76, 77 and 78 of selenium on the outer sides of body sections 67, 68 and 69, respectively. In practice the bodies of selenium may be suitably formed or deposited on the plates in the manner commonly employed in rectifier construction, and the bodies may be of such size or extent as to have the desired capacity.

In accordance with a typical and simple electrical system, the base plate 64 of the rectifier is coupled with the lead 36 that extends to the field F of the generator G. To provide a suitable connection between plate 64 and the lead 36, one of the fasteners 70 may be utilized as shown in Fig. 5 of the drawings where a washer or contact 80 is carried by the fastener and engages the plate 64. The other lead 35 to the field F is electrically coupled with the three separate selenium bodies 76, 77 and 78 and these connections may be made by fasteners 70 in the manner shown in Fig. 6 of the drawings where fasteners 70 located at the said selenium bodies carry contacts 81 that engage the said selenium bodies while a collector or bus member 82 engages the several fasteners 70 thus contacted with the said selenium bodies and has the lead 35 connected to it.

The lead lines 56, 57 and 58 from the armature 41 of the exciter E have individual connection with the selenium bodies on plates 64 and with the body sections 67, 68 and 69 of the other plate. These several connections can be made by means of fasteners 70 in a manner such as is shown in Fig. 7 of the drawings. Where one of the leads, namely 57, is shown connected to a fastener 70 having contact with selenium body 73 through a contact 85 and having contact with plate section 67 through a contact 86, it will be apparent how the other leads from the armature of exciter E may be connected to the other selenium sections on plate 64 and with the plate sections 68 and 69 to complete the circuit as indicated in Figs. 8 and 9 of the drawings.

With the construction and electrical system hereinabove described, as the generator G is operated or driven, the exciter E operates with it and the alternating current generated by the exciter is rectified by the rectifier R so that the rotating field of the generator G is supplied with direct current. So far as the broader principles of the invention are concerned, the structure need only involve the essential elements just referred to. However, it is desirable in most cases to provide a control system C for regulating the action of the generator and when the control system C illustrated in the drawings is employed, the exciter E is provided with a compound field 40 as hereinabove described.

The control system of the present invention may be of simple form as shown in diagram Fig. 10 where the control circuit is energized from the main generator G through a potential transformer T or directly from the output of the generator G if the generated voltage is of suitable magnitude. The control current from the generator G or transformer T is carried by lines 90 and 91 to a suitable rectifier 92 which rectifies the alternating current from the transformer T so that direct current is delivered to lines 50 which connect to the winding or windings 46 of the exciter field. Through this simple arrangement or connection, output from generator G is utilized to energize the electromagnetic field elements of the exciter E. It is to be understood that the exciter field may, if desired, be supplied from any suitable external source such as a battery or suitable generator.

To provide for suitable variation or control, a variable resistance 98 is provided in one of the lines to the rectifier 92. I show a resistance, which may be a simple rheostat or the variable resistance element of any suitable automatic voltage regulator, and I show it located in line 90 between transformer T and rectifier 92. In the particular diagram shown in Fig. 10 the arrows at the permanent magnet 45 and the winding 46 indicate like polarities, in which case the action of these field elements is additive and as a result any energization of windings 46 adds to the power of the field established by the permanent magnets 45. This additive effect is illustrated diagrammatically at 100 in Fig. 13 of the drawings. In this case the permanent magnet field need be only sufficient to cause enough voltage to be generated to initiate the rectifier action. This minor starting field or residual magnetism may be obtained by using special materials for elements of the field structure and does not require specially designed permanent magnet poles as shown in the drawings. However, the use of permanent magnet poles as illustrated makes voltage build up certain and increases the voltage stability of the system.

To gain greater voltage stability, the exciter E may be constructed with permanent magnets 45 of substantial strength, for example of such strength as to provide for more than the desired output from the exciter, and regulation can be gained by employing the electromagnetic units or elements in the field of the exciter energized from the generator G so that they counteract or buck the permanent magnets. In this case any excess voltage will increase the control circuit power and reduce the exciter output thus reducing the excess voltage of the main generator G. This electrical connection or arrangement is illustrated in Fig. 11 along with a compounding circuit to be described later but which in other respects is similar to Fig. 10 and is indicated diagrammatically at 101 in Fig. 13.

In the case of the arrangement or system first described or as shown in Fig. 10, and as indicated at 100 in Fig. 13, error or inaccuracy is amplified so that it is difficult to obtain a predetermined output voltage from generator G. The difficulty just referred to is overcome or reduced by using the arrangement or connection shown in Fig. 11 and indicated diagrammatically at 101 in Fig. 13.

In the forms of the invention illustrated in Figs. 10 and 11 of the drawings, the control in each case as thus far described is operated by voltage derived from a potential transformer with its primary across one or two phases of the main generator. It is to be understood that the main generator may be such as to have any desired number of phases as circumstances require. There is no correction made for variation in power factor which is the ratio of true to apparent power.

With either of the control systems thus far described a compounding action may be obtained by adding compound windings 110 on the electromagnetic field poles and supplying these windings with direct current approximately proportional to the current output of the main generator. Such an arrangement is indicated in Fig. 11 where the current transformer T' supplies alternating current proportional to the line current from the generator. This alternating current is handled by a rectifier 92$^a$ that supplies direct current to windings 110. A shunting resistance 98$^a$ or taps on the current transformer may be added to vary the compounding action.

At 100 in the diagram Fig. 13 the proportional part of the exciter output caused by the permanent magnet or residual field of the exciter is represented by X and the field value or factor added to that of the permanent magnet by reason of the control system C of Fig. 10 is represented by Y. At 101 in the diagram Fig. 13 the values just referred to are represented by corresponding letters of identification but the permanent magnet value is substantially greater than that first described and the value Y is subtracted therefrom. This corresponds to part of the control action shown in Fig. 11. At 102 in Fig. 13 the permanent magnet flux field is reduced to a minimum value and a compounding field factor obtained from the current output of the generator is added as Z. This corresponds in full to the diagram shown in Fig. 11.

In Fig. 12 of the drawings I illustrate a form of the invention wherein the control system C varies with or is responsive to variation in the power factor. In this form of the invention, a typical example of which is illustrated in the diagram Fig. 12, the field of the exciter is a compound field and is shown as involving one or more permanent magnets 45, one or more electromagnetic units each involving a winding 46 and a winding 110. The winding 110 is related to the circuit of the generator the same as the winding in the form of the invention shown in Fig. 11, so that the effect of the winding 110 is added to that of the permanent magnet 45. In the diagram the winding 110 is shown energized from a transformer T" through a rectifier 92$^b$, and a variable resistance 98$^b$ is provided to vary or control flow from the transformer to the rectifier. The transformer T" is a current transformer in a line 31 from phase $a$ of the generator G as indicated in the diagram Fig. 12.

The winding 46 is so coupled to or energized by the generator G as to vary in action with variation in the power factor of the load on generator G, and it is so coupled in the control system or circuit as to counteract or buck the action of both the magnet 45 and winding 110. The power of this winding 46 varies with the load power factor and is such that its bucking action decreases according to or with drop in power factor caused by reactive or lagging loads. Capacitive loads have the opposite effect.

In the particular system illustrated, the winding 46 is energized by current derived from a current transformer T$^a$ loaded to a resistance 116, and a potential transformer T$^b$. The transformer T$^b$ and resistance 116 are connected in series and energize the winding 46 through a rectifier 115. Output from the transformers is subject to adjustment or regulation by varying the shunt resistance 116 or by current transformer taps and by the voltage adjusting rheostat 117 connected in series with one lead of the transformer T$^b$. The rectifier 115 receives the alternating current output from the transformers T$^a$ and T$^b$ and delivers direct current for energization of the winding 46.

In the arrangement illustrated, the current transformer T$^a$ is connected with or energized from phase $a$ of the generator G while the transformer T$^b$ has its primary winding 120 connected between phases $b$ and $c$ of the generator so the phase relation between the outputs of transformers T$^a$ and T$^b$ is 90 degrees at unity power factor.

In operation when the power factor on generator G is unity or one, the phase relationship just referred to is 90 degrees and the effect or output from the combined transformer T$^a$ and T$^b$ is additive vectorially at 90 degrees so that the winding 46 has a large bucking effect in the field of the exciter. As the power factor varies, for example, as it drops below unity in a reactive direction, the phase relationship varies and there is a consequent decrease in the combined output of transformers T$^a$ and T$^b$ with the result that the bucking effect of winding 46 is reduced, the reduction being proportional to the variation in power factor. The variation in the bucking effect of winding 46 continues or will continue until the power factor reaches zero, at which time the out of phase relationship is at a maximum and the bucking effect of the winding 46 is at a minimum. It will be understood of course that when the bucking effect of the winding 46 is at a minimum, the generator combined with the exciter is operating at a maximum capacity, the field of the generator being excited to a maximum by reason of the combined effects of the permanent magnet 45 and the winding 110.

In the diagram Fig. 13 the relationship or operating condition that occurs when the load factor is at unity is indicated at 130 where the values X' and Z' are indicated as combined while the value Y' of the winding 46 is indicated as opposed a maximum amount to the combined values of X' and Z'. At 131 in Fig. 13 a condition is indicated where the power factor is somewhat less than unity. In this case the combined factors X' and Z' are reduced by the factor Y' to the extent that the power factor is less than unity. At 132 in diagram Fig. 13, a condition is represented where the power factor is zero, in which case the factor X' and Z' are reduced by a minimum of factor Y'.

From the foregoing description it will be understood that the present invention by utilizing a dry or plate type rectifier, as distinguished from a commutator or a like mechanical device, simplifies the construction and minimizes or completely reduces difficulties such as ordinarily attend commutators, brush mechanisms, slip rings etc. The invention can be carried out with a rectifier varying in construction from that specifically shown and described. In general the rectifier of the present invention may be termed a dry or plate type rectifier and ordinarily it is advantageous to provide such a rectifier employing bodies of selenium or selenium like material.

From examination of Fig. 1 of the drawings, it will be noted that the particular form of plate or selenium type rectifier illustrated and described is advantageous as it provides a structure of limited size and which is such that it can be readily mounted on the rotor or shaft of an electric machine such as the generator to operate therewith without any unbalancing effect. The rectifier is preferably mounted on the shaft S so that it is concentric therewith and in the preferred arrangement it is mounted at the exterior of the generator case so that it is readily accessible for replacement and repair as may be necessary. In the particular structure illustrated in Fig. 1 of the drawings, the various parts are shown extended axially of the generator considerably more than is necessary in practice. It will be apparent from examination of Fig. 1 how the construction and arrangement as provided by the present invention permits when necessary of a structure of limited or minimum axial extent.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a dynamo-electric machine having a rotating shaft, a direct current field structure including a field winding carried by said shaft, a stationary armature surrounding said field structure, said armature having an alternating current output, an exciter operated by said shaft and including a field winding and an armature delivering alternating current, said exciter armature being carried by said shaft, a rectifier carried by said shaft at one end thereof and converting the current from the exciter to direct current for said first mentioned field winding, and a stationary rectifier connected to said stationary armature and to said exciter field winding for converting alternating current from said stationary armature into a direct current excitation for the exciter field.

2. In combination, a dynamo-electric machine having a rotating shaft, a direct current field structure including a field winding carried by said shaft and a stationary armature surrounding said field structure, said stationary armature having an alternating current output, a case enclosing the field structure and the armature, an exciter including an armature mounted on said shaft and a stationary field structure including a field winding surrounding said exciter armature, a dry-plate type rectifier carried by the shaft and converting alternating current from the exciter armature to direct current for the said first mentioned field winding, said rectifier being mounted on said shaft at the exterior of said case, and a stationary rectifier connected to said stationary armature and to said field winding of said stationary field structure for converting alternating current from said stationary armature into a direct current excitation for the exciter field.

3. In combination, a dynamo-electric machine having a stationary armature, said stationary armature having an alternating current output, an electrically energized field winding, and a rotating shaft carrying said field winding, an exciter operated by the shaft and including a field structure having a permanent magnet and an electrically energized element, and an exciter armature delivering alternating current and carried by said shaft, a rectifier carried by the shaft and converting the alternating current from the exciter armature to direct current for the field winding of the dynamo-electric machine, and a stationary rectifier connected to said stationary armature and to said electrically energized element of said exciter field structure for converting alternating current from said stationary armature into a direct current excitation for said exciter field.

4. In combination, a dynamo-electric machine having a stationary armature, said armature having an alternating current output, an electrically energized field winding, and a rotating shaft carrying said field winding, an exciter operated by the shaft and comprising a field structure having a permanent magnet and an electromagnetic element having the same polarity as the magnet, and an exciter armature carried by said shaft and delivering alternating current, a rectifier carried by the shaft and converting the current from the exciter armature to direct current for the field winding of the dynamo-electric machine and a stationary rectifier connected to said stationary armature and to said electromagnetic element for converting alternating current from said stationary armature into a direct current excitation for the exciter field.

5. The combination as claimed in claim 4 wherein said electromagnetic element is supplied with a regulated and rectified alternating current voltage.

6. In combination, a dynamo-electric machine having an armature and an electrically energized field winding, and a rotating shaft carrying said field winding, an exciter operated by the shaft and including a field structure having a permanent magnet and an electromagnetic element with the same polarity as the magnet, and an armature delivering alternating current, said armature being carried by said shaft, a rectifier carried by the shaft and converting the alternating current from the exciter to direct current for the field winding of the dynamo-electric machine, a transformer energized by the dynamo-electric machine, a rectifier converting alternating current from the transformer and delivering direct current to said electromagnetic element of the exciter.

7. In combination, a dynamo-electric machine having an armature and an electrically energized field winding, and a rotating shaft carrying said field winding, an exciter operated by the shaft and including a field structure having a permanent magnet and an electromagnetic element of the same polarity as the magnet, and an exciter armature delivering alternating current, said armature being carried by said shaft, a rectifier carried by the shaft and converting the current from the exciter to direct current for the field winding of the dynamo-electric machine, a potential transformer energized by the dynamo-electric machine, a rectifier converting the alternating current from the transformer and delivering direct current to said electromagnetic element of the exciter, and a variable resistance controlling flow of current from the transformer to the last mentioned rectifier.

8. In combination, a dynamo-electric machine having a stationary armature, said armature having an alternating current output, an electrically energized field winding, and a rotating shaft carrying said field winding, an exciter operated by the shaft and comprising a field structure having a permanent magnet and an electromagnetic element having a polarity opposite to that of the permanent magnet, an armature carried by said shaft and delivering alternating current; a rectifier carried by the shaft and converting the current from the exciter to direct current for the field winding of the dynamo-electric machine, and a stationary rectifier connected to said stationary armature and to said electromagnetic element for converting alternating current from said stationary armature into a direct current excitation for the exciter field.

9. The combination as claimed in claim 8 wherein said electromagnetic element is supplied with a regulated and rectified alternating current voltage.

10. In combination, a dynamo-electric machine having an armature, an electrically energized field winding, and a rotating shaft carrying said field winding, an exciter operated by the shaft and including a field structure having a permanent magnet and an electromagnetic element having a polarity opposite to that of the permanent magnet, and an armature delivering alternating current, said armature being carried by said shaft, a rectifier carried by the shaft and converting the alternating current from the exciter to direct current for the field winding of the dynamo-electric machine, a transformer energized by the dynamo-electric machine, a rectifier converting alternating current from the transformer and delivering direct current to said electromagnetic element of the exciter.

11. In combination, a dynamo-electric machine having an armature and an electrically energized field winding, and a rotating shaft carrying said field winding, an exciter operated by the shaft and including a field structure having a permanent magnet and an electromagnetic element having a polarity opposite to that of the permanent magnet, and an armature delivering alternating current, said armature being carried by said shaft, a rectifier carried by the shaft and converting the current from the exciter to direct current for the field winding of the dynamo-electric machine, a potential transformer energized by the dynamo-electric machine, a rectifier converting the alternating current from the transformer and delivering direct current to said electromagnetic element of the exciter, and a variable resistance controlling flow of current from the transformer to the last mentioned rectifier.

12. In combination, a dynamo-electric machine having an armature and an electrically energized field winding and a rotating shaft carrying said field winding, an exciter operated by the shaft and including a field structure and an armature delivering alternating current, said armature being carried by said shaft, a rectifier carried by the shaft and converting the current from the exciter to direct current for the field winding of the dynamo-electric machine, the field structure of the exciter including a permanent magnet and an electromagnetic element of opposite polarity to the permanent magnet, said electrically energized element being energized from the armature of the dynamo-electric machine through a potential transformer and a current transformer connected in series and acting through a rectifier.

13. In combination, a dynamo-electric machine having an armature and an electrically energized field winding, and a rotating shaft carrying said field winding, an exciter operated by the shaft and including a field structure and an armature delivering alternating current, said armature being carried by said shaft, a rectifier carried by the shaft and converting the current from the exciter to direct current for the field winding of the dynamo-electric machine, the field structure of the exciter including a permanent magnet, two electromagnetic units of opposite polarity one aiding the magnet and the other opposing the magnet, and a control including a circuit to the first-mentioned electromagnetic unit energized by the dynamo-electric machine through a current transformer and a rectifier, and a circuit to the said other electromagnetic unit energized from the dynamo-electric machine.

14. The combination as claimed in claim 13 wherein said last-mentioned electromagnetic unit is energized from the dynamo-electric machine through a potential transformer and a rectifier.

15. In combination, a dynamo-electric machine having an armature and an electrically energized field winding, and a rotating shaft carrying said field winding, an exciter operated by the shaft and including a field structure having a permanent magnet and an electromagnetic element having the same polarity as the magnet, and an armature delivering alternating current, said armature being carried by said shaft, a rectifier carried by the shaft and converting the current from the exciter to direct current for the field winding of the dynamo-electric machine, a current transformer energized by the dynamo-electric machine, a rectifier converting alternating current from the transformer and delivering direct current to said electromagnetic element of the exciter, and means for controlling flow of current from the transformer to the last mentioned rectifier.

16. The combination as claimed in claim 15 wherein the means for controlling flow of current from the transformer to the last mentioned rectifier is a variable resistance.

17. In combination, a dynamo-electric machine having an armature and an electrically energized field winding, and a rotating shaft carrying said field winding, an exciter operated by the shaft and including a field structure and an armature delivering alternating current, said armature being carried by said shaft, a rectifier carried by the shaft and converting the current from the exciter to direct current for the field winding of the dynamo-electric machine, the field structure of the exciter including a permanent magnet and an electro-magnetic element of opposite polarity to the permanent magnet, said electrically energized element being energized from the armature of the dynamo-electric machine through a potential transformer and a current transformer connected in series and acting through a rectifier, a variable series resistance for controlling the output of the potential transformer and means for controlling the output of the current transformer.

18. The combination as claimed in claim 17 wherein the means for controlling the output of the current transformer consists of a variable shunt resistance.

19. In combination, a dynamo-electric machine having an armature and an electrically energized field winding, and a rotating shaft carrying said field winding, an exciter operated by the shaft and including a field structure and an armature delivering alternating current, said armature being carried by said shaft, a rectifier carried by the shaft and converting the current from the exciter to direct current for the field winding of the dynamo-electric machine, the field structure of the exciter including a permanent magnet, two electromagnetic units of opposite polarity, one supporting the magnet and the other opposing the magnet, and a control including a circuit to the first-mentioned electromagnetic unit energized by the dynamo-electric machine through a current transformer and a rectifier and controlled by a variable shunt resistance, and a circuit to the said other electromagnetic unit energized from the dynamo-electric machine through a potential transformer and a current transformer connected in series and acting through a rectifier, means for controlling the output of the last mentioned current transformer and a variable series resistance for controlling the output of the potential transformer.

20. The combination as claimed in claim 19 wherein the means for controlling the output of the last-mentioned current transformer consists of a variable shunt resistance.

21. In combination, a dynamo-electric machine having an armature, an electrically energized field winding, and a rotating shaft carrying said field winding, an exciter operated by said shaft and comprising a field structure having a permanent magnet and an electromagnetic element having the same polarity as said magnet, an armature carried by said shaft and delivering alternating current, and a rectifier carried by said shaft and converting the current from the exciter to direct current for the field winding of the dynamo-electric machine, said electromagnetic element being supplied with a regulated and rectified alternating current voltage.

References Cited in the file of this patent

UNITED STATES PATENTS

| Number | Name | Date |
|---|---|---|
| 2,377,930 | Fuller | June 12, 1945 |
| 2,414,287 | Crever | Jan. 14, 1947 |
| 2,478,749 | De Lance et al. | Aug. 9, 1949 |
| 2,482,875 | Sawyer | Sept. 27, 1949 |
| 2,486,110 | Bugel et al. | Oct. 25, 1949 |
| 2,497,141 | Schultz | Feb. 14, 1950 |
| 2,525,495 | Lynn | Oct. 10, 1950 |